Figure 4:
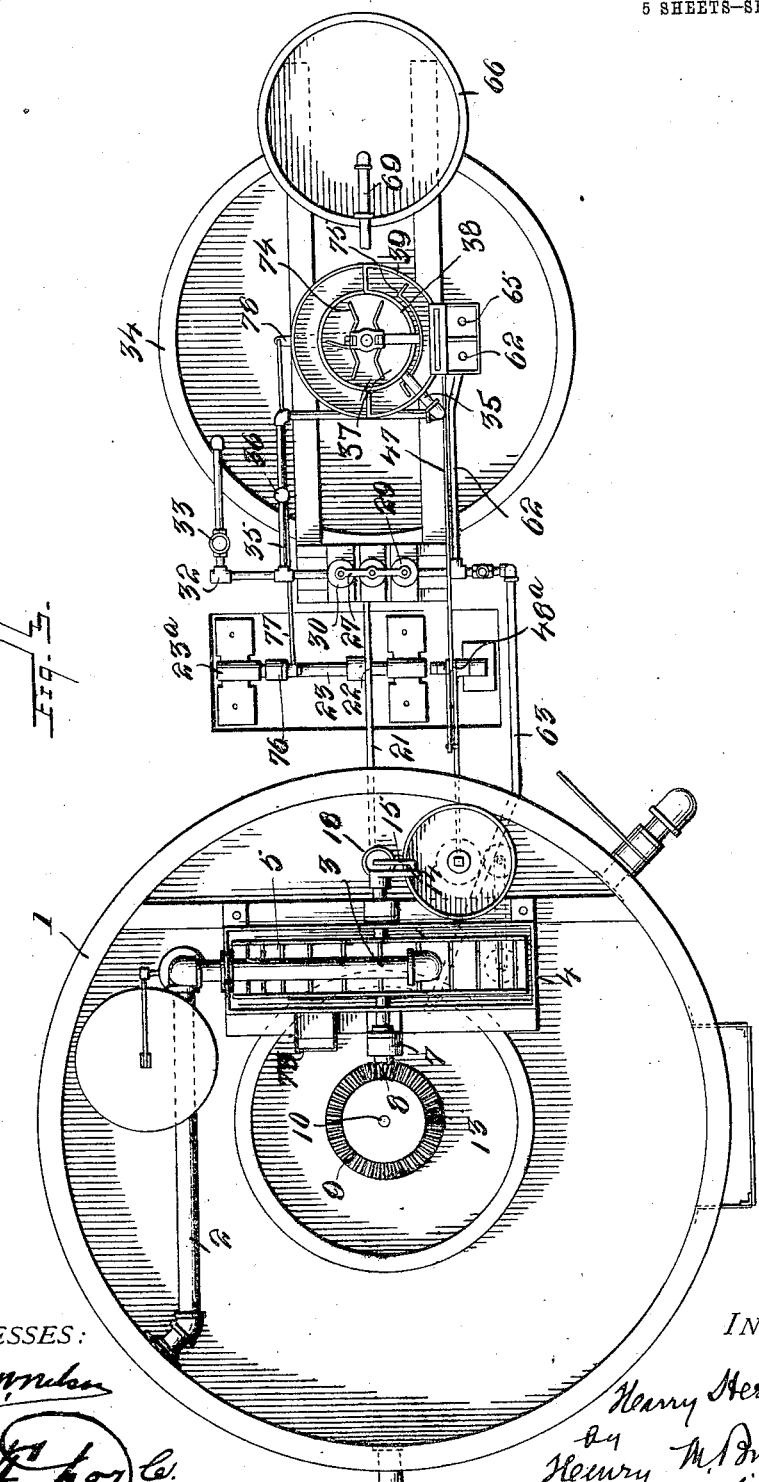

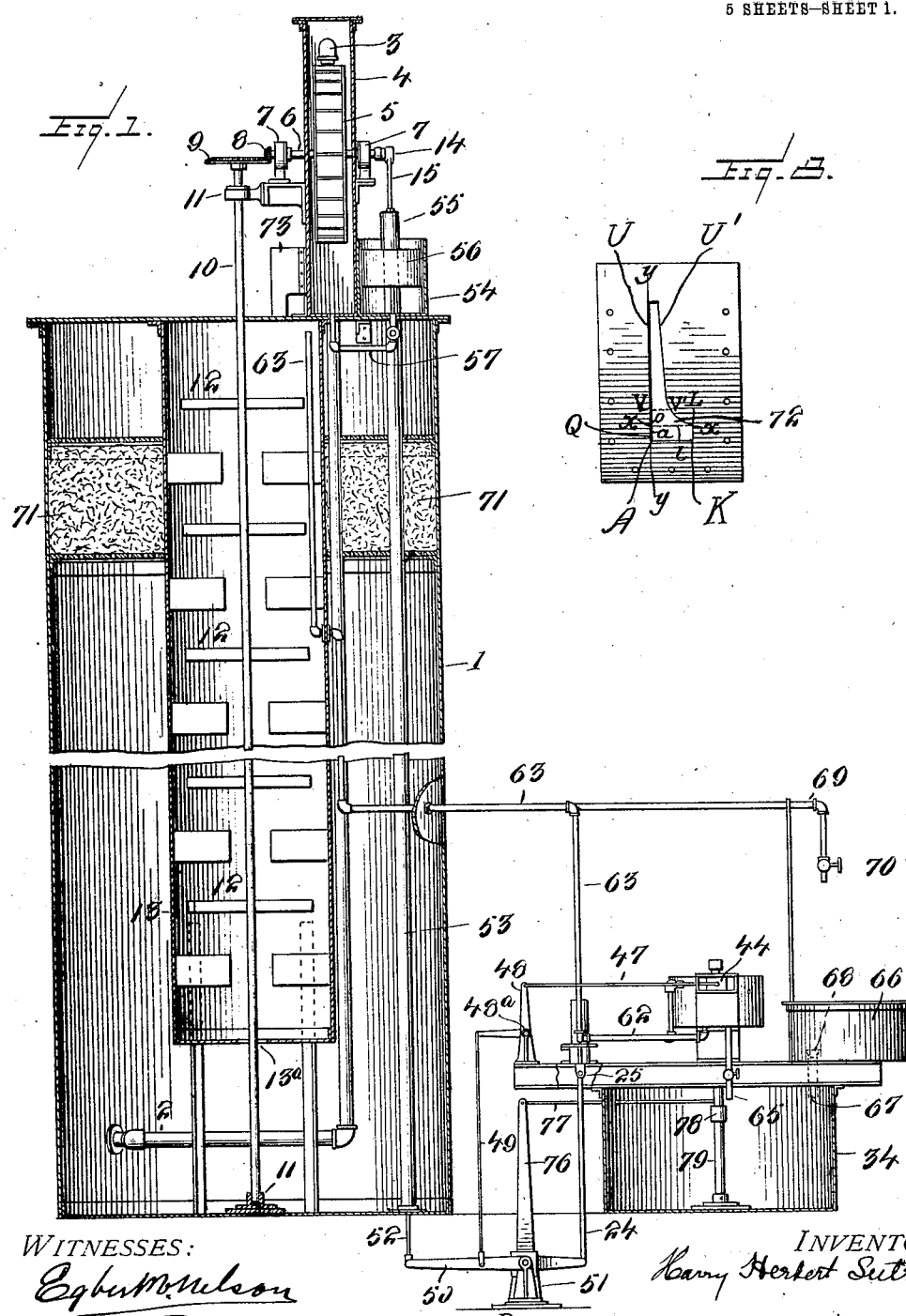

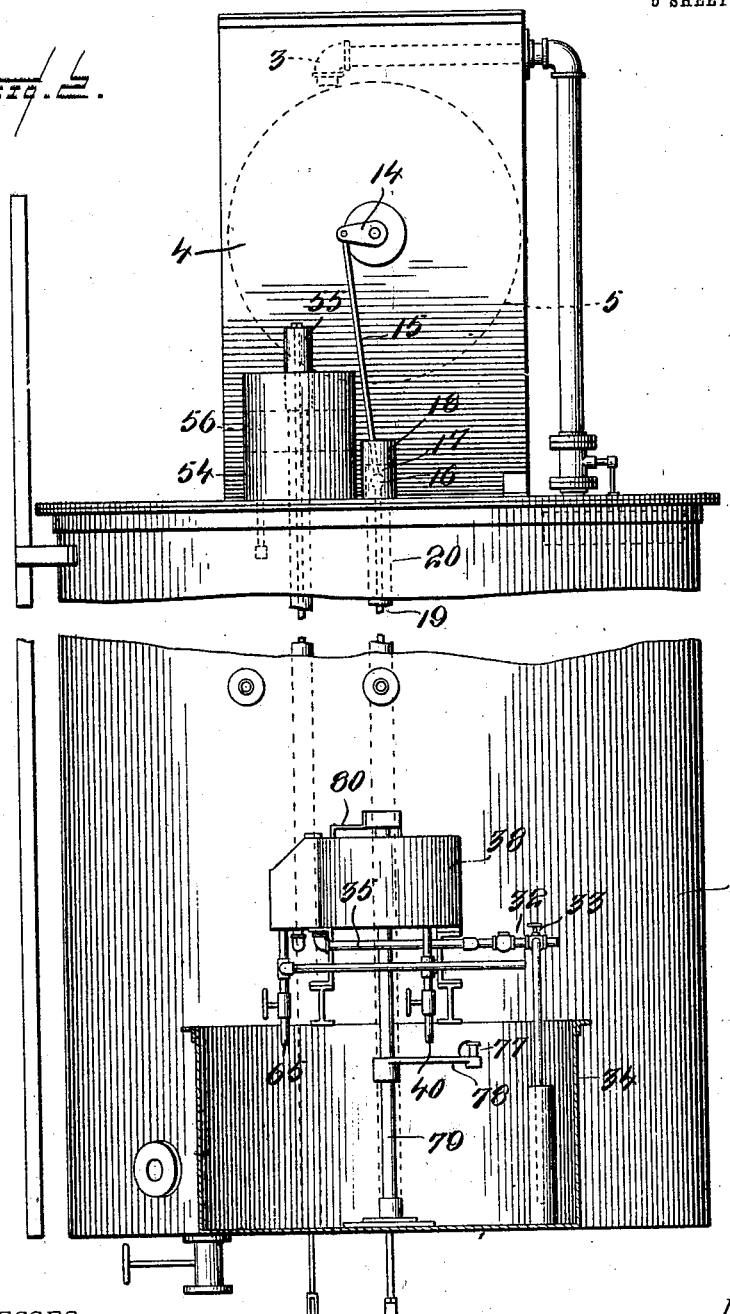

H. H. SUTRO, DEC'D.
V. SUTRO, ADMINISTRATOR.
APPARATUS FOR TREATING LIQUIDS.
APPLICATION FILED JUNE 1, 1909.

1,077,316.

Patented Nov. 4, 1913.
5 SHEETS—SHEET 3.

WITNESSES:

INVENTOR
Henry Herbert Sutro
by Henry M. Ingham
his Attorney

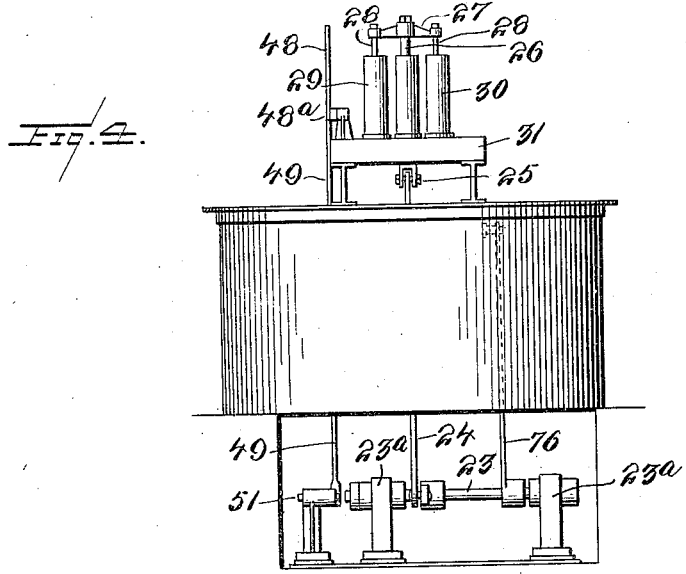
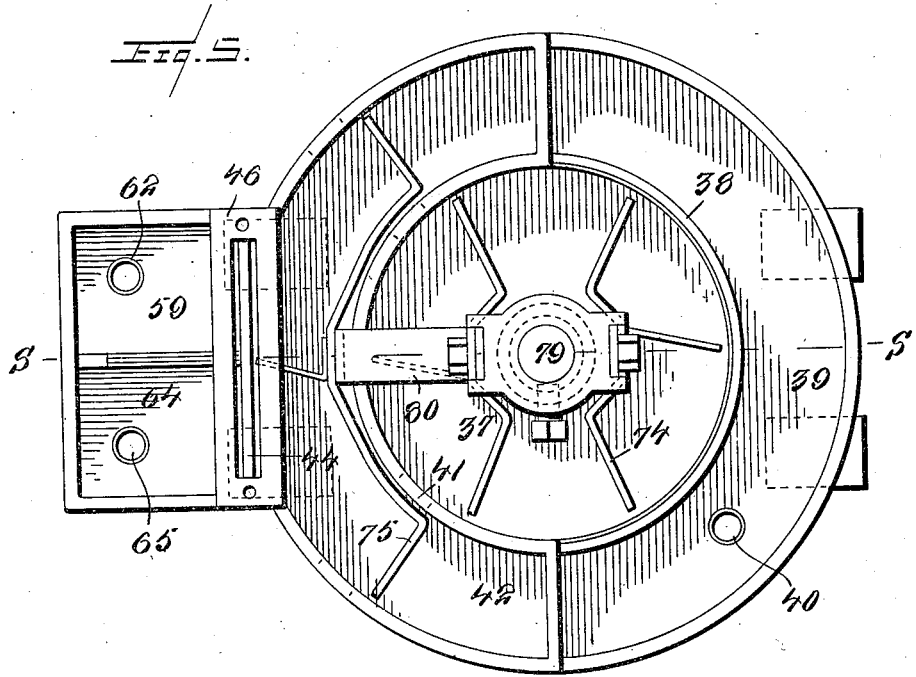

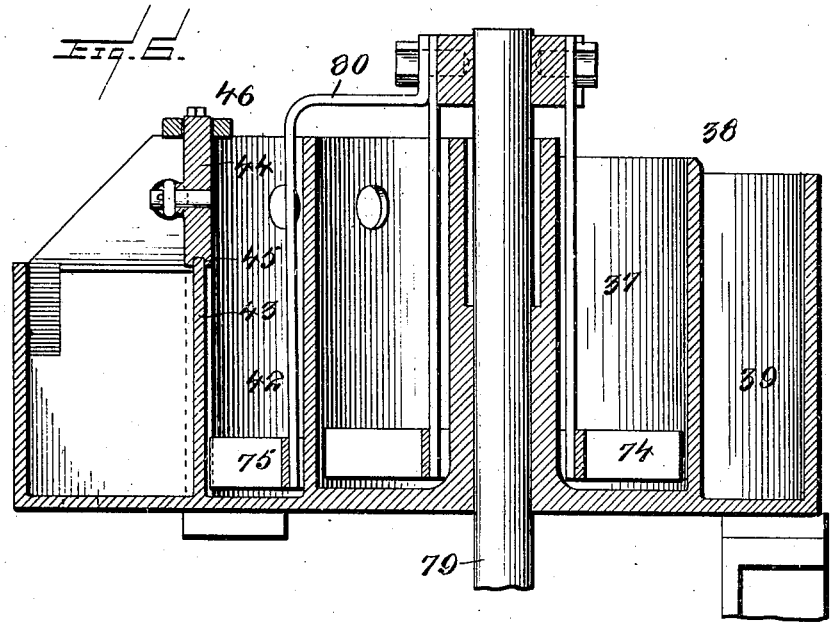
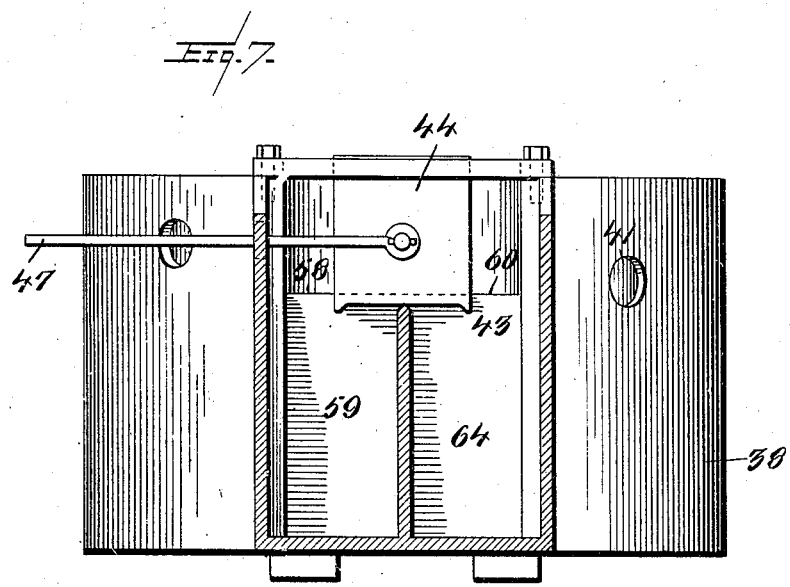

UNITED STATES PATENT OFFICE.

HARRY HERBERT SUTRO, OF NEW YORK, N. Y.; VICTOR SUTRO, ADMINISTRATOR OF SAID HARRY HERBERT SUTRO, DECEASED, ASSIGNOR TO L. M. BOOTH COMPANY, A CORPORATION OF NEW YORK.

APPARATUS FOR TREATING LIQUIDS.

1,077,316.  Specification of Letters Patent.  Patented Nov. 4, 1913.

Application filed June 1, 1909. Serial No. 499,559.

*To all whom it may concern:*

Be it known that I, HARRY HERBERT SUTRO, a citizen of the United States, and residing in the borough of Manhattan, city, county, and State of New York, have invented a new and useful Improvement in Apparatus for Treating Liquids, of which the following is a specification.

The object of my invention is to produce a simple and effective apparatus for treating liquids with reagents, and the particular features of my invention are described in the following specification and pointed out in the appended claims.

In the accompanying drawings, Figure 1 is a front view, partly in section, of the preferred form of my apparatus. Fig. 2 is a side view of my apparatus, partly in section. Fig. 3 is a plan view of my improved apparatus. Fig. 4 is an elevation showing the chemical tank and pumps by which the chemicals are supplied to the apparatus. Fig. 5 is a plan view of the chemical regulating box. Fig. 6 is a sectional view of the chemical regulating box on the line *s s*, Fig. 5. Fig. 7 is a front view of the chemical regulating box, showing the sliding gate or valve which regulates the flow of chemical to the apparatus. Fig. 8 shows a portion of one of the walls of the raw liquid box and the discharge port through which the raw liquid is fed to the apparatus.

Similar numerals of reference refer to corresponding parts throughout the accompanying drawings.

It will be understood that many changes may be made in the apparatus described without departing from the spirit or scope of my invention.

The apparatus shown in the drawing is particularly adapted to the treatment of water. The principal tank 1 which forms the settling tank is cylindrical in form and the raw water enters the apparatus through the pipe 2 near the bottom of the tank 1, from which point the pipe 2 extends upward, and overflows through the nozzle 3 into the wheel box 4, where it is discharged upon the water wheel 5 which is mounted upon a shaft 6 and supported in bearings 7. To one end of the shaft 6 is attached a beveled pinion 8 which meshes with a beveled gear 9 attached to the upper end of a shaft 10, which is mounted in bearings 11.

Agitator arms 12 are secured to the shaft 10 which extends through the mixing tank 13, which is mounted within the settling tank 1 and extends downwardly to a point near the bottom of said tank, where it discharges into the settling tank through the opening 13ª. The purpose of such agitating arms is to thoroughly mix and agitate the liquid contents of the tank 13. On the opposite end of the shaft 6 is mounted a crank 14 to which is connected a link-rod 15, which is pivotally connected at 16 to the movable head 17, mounted in the guide-box 18, which is secured to the top of the tank 1. A rod 19 is secured to the movable head 17 and passes through a sleeve 20 which extends through the tank 1 and, passing below the bottom of the tank 1, is connected to a lever 21, which is secured at 22, to the shaft 23, which is mounted in bearings 23ª. The other end of the lever 21 is connected to the link 24, the upper end of which is pivoted at 25 to a rod 26, which is connected at its upper end to a cross piece 27, to which are attached pump plungers 28 which, by the oscillation of the lever 24, are operated in the pump bodies 29 and 30; said pump bodies being mounted on the support 31. Connected with the lower part of the pump body 30 is a pipe 32 provided with a check valve 33, adapted to check any flow of liquid from the pump body back through the pipe. The other end of the pipe 32 communicates with the chemical tank 34. A second pipe 35 also communicates with the lower end of the pump body 30 and is provided with a check valve 36 adapted to prevent any flow of liquid through the pipe 35 into the pump. The other end of the pipe 35 communicates with the fixed level chamber 37 of the regulating box 38, the purpose of the pump 30 being to pump from the tank 34 through the pipes 32—35 an excess of chemical reagent into the chamber 37, from which chamber the excess overflows over the weir 38 into the chamber 39, from which chamber it is returned through the pipe 40 to the chemical reagent tank 34. The chamber 37 is also provided with a discharge outlet 41, at a distance of about two inches below the top of the weir 38. This discharge opening communicates with a chamber 42, and I have found it desirable to make the opening communicating between the chambers 37 and 42 somewhat below the level of the weir in the chamber 37, so that a slight variation in the head of the liquid in the chamber 37 will not cause any substantial variation in the flow of liquid through the discharge opening 41 into the chamber 42.

The chamber or tank 42 is provided with a weir 43 and with a gate 44, having a groove 45 in the lower edge thereof which is adapted to receive the upper edge of the weir 43, and said gate is held in position by the guide 46, so that it can be moved across the upper edge of said weir. To this movable gate is attached a rod 47 which is connected to a bell-crank 48, mounted on the fulcrum 48ª. To the other arm of the bell-crank 48 is attached a rod 49, the opposite end of which is attached to a lever 50, which is pivoted to a support 51. A rod 52 is attached to one end of the lever 50 and passes upward through the tank 1 and through the float tank 54 through a sleeve 53, and is connected by means of a sleeve 55 to a float 56 mounted in the float tank 54. Communicating with the wheel-box 4 and the tank 54 is a pipe 57 by means of which the same water level is maintained in the tanks 4 and 54, the result being that when a greater amount of water is flowing into the box 4 and the level therein rises, the level will also rise in the box 54, which will cause the float 56 to rise, elevating the rod 52 and the end of the lever 50, to which it is attached, elevating the rod 49 and the arm of the bell-crank to which it is attached, causing the rod 47 to shift the gate 44 along the weir 43, increasing the width of the discharge opening 58 which communicates with the compartment 59, and diminishing the size of the discharge opening 60 and causing a larger proportion of liquid in the tank 42 to overflow into the compartment 59, from which the reagent liquid is carried by the pump 29 through the pipes 62—63 to the mixing-tank 13, where it is mingled with the raw water. The excess of liquid which is discharged from the tank 42 overflows through the opening 60 into the compartment 64 from which it is returned to the chemical reagent tank 34 by means of the pipe 65.

I have provided the tanks 37 and 42 with agitators 74—75, which are operated by means of the crank 76, to which is connected a rod 77 which is connected to a crank 78, which is secured to the shaft 79 upon which the agitator 74 is securely mounted. Connected to the agitator 74 is a bar 80 which is connected to the agitator 75.

I provide my apparatus with a lime slaking tank 66, which has a discharge pipe 67 communicating with the chemical reagent tank 34. The discharge opening is provided with a plug 68 which can be removed at pleasure. This tank 66 is adapted to receive the unslaked lime which is slaked by means of water supplied through the pipe 69, which communicates with the tank 1 and is provided with a cock 70. The settling tank 1 is provided with the usual filter 71. A chute 73 conveys the water from the wheel box to the mixing-tank 13 by way of a discharge opening 72 in one of the walls of the wheel box as shown in Fig. 8, such discharge opening being of such shape that the flow of water therethrough will be in direct proportion to the height of the water above a fixed point.

If we assume this fixed point to be on a level with the bottom of the orifice the curved side of the orifice assumes a shape represented by the equation $$x = -\frac{2}{\pi}pc\sqrt{2g}y^{-\frac{1}{2}}$$

the notation being the ordinary one used in analytic geometry; $x$ and $y$ being referred to rectangular coördinates; $p$ being an arbitrary constant which determines the size of the ratio between the head of the water and the corresponding discharge; $\pi$ being $3.14159+$; $g$ being the acceleration of gravity, usually taken at 32.16 at sea level; and $c$ being the coefficient of discharge for water, usually taken at .62. The bottom and remaining side of the orifice are formed by the axes of X and Y, respectively. The fixed point may also be assumed at some other level than at the level of the bottom of the orifice. We then obtain a shape of orifice differing from the one described above, which as already stated is defined by the curve $$x = -\frac{2}{\pi}pc\sqrt{2g}y^{-\frac{1}{2}}$$

If we assume the fixed point to be at a level $\frac{a}{3}$ above the bottom of the orifice ($a$ representing any convenient height) the equation of the curved side of the orifice becomes $$x = pc\sqrt{2gl}\left[1 - \frac{2}{\pi}\tan^{-1}\sqrt{\frac{y}{a}}\right].$$

It is this modified form of orifice I prefer to employ.

Referring to Fig. 8, U A K U' represents this orifice. XX and YY are the axes of coördinates, OA=a, OL=l, while $c$, $g$, $p$ and $\pi$ respectively, have their already named significance and value. The discharge of water through this orifice is proportional to the head of water above the point Q, located at the distance $\frac{a}{3}$ above the bottom AK of the orifice; but this proportionality is lost as soon as the water level drops lower than the level XX. In practice I make the height a small as compared with the total height of orifice to be utilized and it may, in any particular instance, be made as small as desired and the proportional relation of head and discharge will still hold good for levels above level XX. From the foregoing, it will readily be understood that owing to the fundamental property of the orifice each inch of increased head, for example, above the head at VV' induces a fixed increment in the amount of water discharged through the said orifice and that the several increments are mutually equal. Other shapes of orifice giving similar results may also be used.

The operation of my apparatus is as follows: Raw water is discharged into the wheel box through the nozzle 3 upon the water wheel 5, causing it to rotate. The rotation of the shaft 6 is imparted through the gears 8 and 9 to the shaft 10, causing it and its agitator arms 12 to rotate in the mixing tank. As the liquid rises or falls in the wheel box and correspondingly in the float tank 54, (in exact proportion to the amount of water flowing), the float 56 rises or falls, and through the rod 52 and the various connections heretofore described, moves the gate 44 across the weir 43, in direct ratio with its rise or fall, increasing or decreasing the size of the discharge opening at 58 from the chamber 42 into the compartment 59, so that the chemical reagent discharged into this compartment and carried by the pump 29 to the mixing tank to mingle with the raw water will be in exact proportion to the amount of water entering such tank for treatment. At the same time, through the pump 30, a surplus of chemical reagent will be carried to the chamber 37. Owing to the wide overflow weir 38 of this chamber, the level of reagent therein remains substantially fixed and the excess of reagent will overflow over the weir 38 and return to the chemical reagent tank; a portion of the liquid from the chamber 37, as above described, flows through the opening 41 into the chamber 42, in which a constant level is maintained, the slight rise and fall of the liquid in the chamber 37 having no appreciable effect on the quantity of liquid which is discharged into the chamber 42, as the discharge opening from the chamber 37 is considerably below the level of the liquid in chamber 37, as already described. By this construction any substantial variation of liquid level in the chamber 42, resulting from the pumping operations is avoided, and an accurate constant level maintained therein. By the means described I am able to control with great accuracy the amount of liquid discharged into the compartment 59 and to supply from this compartment the chemical reagent which, under varying conditions of operation, is always practically in exact proportion to the amount of water flowing from the wheel box to the mixing tank, so long as a certain minimum flow is exceeded.

In treating a water with a mixture of soda ash solution and milk of lime the volume of reagent solution to be fed is small relative to the amount of water to be treated. The problem is to feed it in proportion to the flow of water to be treated. Under practical conditions of operation an absolutely fixed level of reagent cannot be maintained for any lengthy period. My endeavor has been to reduce the variations of level to a negligible amount.

The theory and practice of this proceeding are as follows: By providing the chamber 37 with the wide overflow weir 38 I minimize the difference of level in this chamber resulting from the varying quantities of reagent supplied to it by the pump 30, as this pump operates slowly or rapidly. By locating the discharge orifice 41 from this chamber at a substantial distance below the top of the liquid, I minimize the variations in discharge through said orifice due to differences (already small) of level in chamber 37, since the influence of such differences of level on the discharge from a submerged orifice diminishes rapidly as the depth of submergence of the orifice increases. The resulting differences in level in the chamber 42, while of course they exist, are practically imperceptible and negligible. Furthermore, as the reagent liquid is not a clear solution, but on the contrary contains very much solid matter in suspension, I select that shape for the orifice 41, which is least liable to become clogged or obstructed, namely, the circular form. The reagent stream discharged from a circular orifice, however, does not readily lend itself to be divided proportionally to the flow of water. To accomplish this division to the best advantage, therefore, I provide the second orifice, in this case a weir, of the shape best adapted to proportional division of the stream or apron discharged through it, namely the horizontally elongated form. In practice the stream discharged through the small circular orifice subsequently flows uniformly over a weir crest at 43 with a net length of some three inches, being thus easily divided by the slide 44 in exact proportion to the flow of raw water as described.

Having described my apparatus, which I claim as new and desire to secure by Letters Patent is:

1. In an apparatus for treating flowing liquids with reagents, a source of reagent supply, a weir, means for discharging the reagent over the weir in a stream, a movable deflector automatically actuated by an increase or decrease in the flow of liquid and adapted to cut off from such stream of reagent an amount of reagent in direct proportion to the flow of liquid to be treated, and means for supplying the reagent so cut off to the liquid to be treated.

2. In an apparatus for treating liquids with reagents, a source of reagent supply, means for discharging the reagent in a horizontally elongated apron or stream at a predetermined head, a horizontally movable deflector actuated in direct proportion to and by an increase or decrease in the flow of liquid to be treated and adapted to cut off from the wide apron or stream of reagent a portion thereof and means for supplying the reagent so cut off to the liquid to be treated.

3. In an apparatus for treating liquids with reagents, a source of reagent supply, means for supplying reagent to a chamber provided with an overflow weir, and with a submerged orifice communicating between said chamber and a second chamber, a discharge weir for said second chamber, a movable member traveling on said discharge weir and adapted to cut off a percentage of the flow of reagent over said discharge weir and means for supplying the percentage of reagent so cut off to the liquid to be treated.

4. In an apparatus for treating a liquid with a reagent, a liquid container provided with a discharge orifice therein, of such proportional dimensions that the flow of liquid therethrough will be in direct proportion to the height of the liquid above a fixed point, and means controlled by the height of liquid flowing through said orifice for regulating the amount of reagent fed to the liquid.

5. In an apparatus for treating liquids, a compartment adapted to receive the raw liquid, provided with a discharge orifice of such proportional dimensions that the flow of liquid therethrough will be in direct proportion to the height of liquid above a certain fixed point of the orifice, a chemical supply tank, means for maintaining a uniform level therein, such chemical supply tank being provided with a weir over which the chemical reagent overflows, and a gate adapted to be shifted along the weir and increase or decrease the flow of said chemical reagent to the tank from which it is supplied to the raw liquid in direct proportion to the height of liquid in said raw water compartment.

6. In an apparatus for treating liquids, a source of reagent supply, means for causing an excessive flow of reagent from the source of supply, means for diverting from such excessive flow of reagent a predetermined flow of reagent and means for automatically diverting from such predetermined flow of reagent an amount which shall be in direct proportion to the flow of liquid to be treated.

7. In apparatus for treating liquids, a source of reagent supply, means for causing an excessive flow of reagent from such source of supply, means for diverting from such excessive flow a predetermined flow of reagent, means actuated by the liquid to be treated for diverting from such predetermined flow of reagent to the liquid to be treated an amount of reagent in direct proportion to the flow of liquid to be treated.

8. In an apparatus for treating of liquids a compartment adapted to receive raw liquid provided with an orifice through which raw liquid is supplied to the apparatus, a second compartment provided with a second orifice through which reagent is delivered to the apparatus, a movable member adapted to be shifted relatively to the second orifice and thus controlling the quantity of reagent supplied to the apparatus and automatic means controlled and actuated by the amount of liquid in said first compartment adapted to shift said movable member in direct proportion to the liquid supplied to the apparatus.

9. In apparatus for treating liquids, means for supplying raw liquid to the apparatus and means for discharging treated liquid therefrom, a reagent container having an orifice through which reagent is delivered to the apparatus, a movable member adapted to be shifted relatively to said orifice and thus control the quantity of reagent supplied to the apparatus, and automatic means controlled and actuated by the liquid supplied to the apparatus adapted to shift said movable member in direct proportion to the liquid supplied to the apparatus.

Signed at the borough of Manhattan, in the city, county, and State of New York, this 7th day of May, A. D. 1909.

HARRY HERBERT SUTRO.

Witnesses:
EGBERT V. NELSON,
EMORY L. GROFF.